United States Patent
Minyu et al.

(10) Patent No.: US 10,248,228 B2
(45) Date of Patent: Apr. 2, 2019

(54) OPERATION INPUT DEVICE

(71) Applicant: HONDA MOTOR CO., LTD., Tokyo (JP)

(72) Inventors: Nobuko Minyu, Wako (JP); Junichiro Onaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/643,927

(22) Filed: Jul. 7, 2017

(65) Prior Publication Data

US 2018/0011556 A1 Jan. 11, 2018

(30) Foreign Application Priority Data

Jul. 7, 2016 (JP) .................................. 2016-134976

(51) Int. Cl.
*G06F 3/0362* (2013.01)
*G06F 3/01* (2006.01)
*G06F 3/038* (2013.01)
*G06F 3/0487* (2013.01)

(52) U.S. Cl.
CPC ............ *G06F 3/0362* (2013.01); *G06F 3/016* (2013.01); *G06F 3/038* (2013.01); *G06F 3/0487* (2013.01); *G06F 2203/04808* (2013.01)

(58) Field of Classification Search
CPC ...... G01B 7/003; G01S 17/023; G01V 3/088; G06F 3/016; G06F 3/04886
See application file for complete search history.

(56) References Cited

U.S. PATENT DOCUMENTS

| 7,924,271 | B2* | 4/2011 | Christie | G06F 3/04883 345/173 |
| 9,766,705 | B2* | 9/2017 | Chan | G06F 3/0362 |
| 2010/0007618 | A1* | 1/2010 | Park | G06F 1/1626 345/173 |
| 2014/0139637 | A1* | 5/2014 | Mistry | H04N 5/2252 348/46 |
| 2014/0247240 | A1* | 9/2014 | Sinclair | G06F 3/0488 345/174 |
| 2014/0375580 | A1* | 12/2014 | Peshkin | G06F 3/016 345/173 |

(Continued)

FOREIGN PATENT DOCUMENTS

| JP | 2010-15239 A | 1/2010 |
| JP | 2012-22633 A | 2/2012 |

(Continued)

OTHER PUBLICATIONS

Office Action dated Dec. 5, 2017, issued in counterpart Japanese Application No. 2016-134976, wih English translation (9 pages).

*Primary Examiner* — William Lu
(74) *Attorney, Agent, or Firm* — Westerman, Hattori, Daniels & Adrian, LLP (57) ABSTRACT

An operation member 30 of an operation input device 20 includes a finger sensor 54 adapted to detect each of a plurality of fingers gripping the operation member 30. A controller 36 specifies the number of gripping fingers Ngf which is the number of fingers 300 gripping the operation member 30 based on the detection result of the finger sensor 54 and switches, in accordance with the number of gripping fingers Ngf, a type of an operation command corresponding to the operation input.

9 Claims, 5 Drawing Sheets

(56) References Cited

U.S. PATENT DOCUMENTS

| | | | |
|---|---|---|---|
| 2015/0116205 A1* | 4/2015 | Westerman | G06F 3/016 |
| | | | 345/156 |
| 2015/0192989 A1* | 7/2015 | Kim | G06F 3/011 |
| | | | 345/156 |
| 2015/0241195 A1* | 8/2015 | Schenkewitz | H03K 17/975 |
| | | | 324/658 |
| 2016/0342208 A1* | 11/2016 | Levesque | G06F 3/016 |

FOREIGN PATENT DOCUMENTS

| | | |
|---|---|---|
| JP | 2014-194718 A | 10/2014 |
| JP | 2015-176286 A | 10/2015 |
| JP | 2015-191483 A | 11/2015 |
| JP | 2016-119022 A | 6/2016 |

\* cited by examiner

OPERATION INPUT DEVICE

CROSS-REFERENCE OF RELATED APPLICATION

This application claims priority of Japanese Patent Application No. 2016-134976 filed in Japan on Jul. 7, 2016, the entire contents of which are incorporated herein by reference.

TECHNICAL FIELD

The present invention relates to an operation input device comprising an operation member which is operated by a plurality of user's fingers and a computer (a controller) adapted to process an operation input to the operation member to control at least one operation target device.

BACKGROUND OF THE INVENTION

In Japanese Published Unexamined Application No. 2015-176286, it is intended to provide a device operation apparatus which can promptly perform an operation of an electronic device (see [0005] and ABSTRACT). To attain its objective, in Japanese Published Unexamined Application No. 2015-176286 (see ABSTRACT, FIGS. 2 to 6, etc.), an operation unit 11 is provided with a touch pad 23 and an operation input section 25. The operation unit 11 outputs a control signal corresponding to the input operation of the touch pad 23 and the operation input section 25 to a dial 41 to an electronic device 3. The dial 41 is disposed in a back side area of an input surface (upper surface) of the touch pad 23. With this arrangement, it is said that both the input operation to the touch pad 23 and the input operation to the dial 41 can be performed at the same time with one hand.

Also, in Japanese Published Unexamined Application No. 2015-176286 (see [0044]), the following example of control is shown. Namely, in the case where a vehicle passenger performs only an operation of the dial 41, the sound volume of music is caused to change. When operating the dial 41 touching the touch pad 23 with one finger, a channel of AM radio broadcast can be changed to another one. When operating the dial 41 touching the touch pad 23 with two fingers, a channel of FM radio broadcast can be changed to another one. Further, when the vehicle passenger performs a dial operation while touching the touch pad 23 with his/her three fingers, it is possible to operate a set temperature of an air conditioner.

SUMMARY OF THE INVENTION

As described above, in Patent Document 1, the touch pad 23 is physically separated from the dial 41. Therefore, there is a room for improvement in operability and a degree of freedom for design.

The present invention was made in consideration of the problems stated above. An object of the present invention is to provide an operation input device which can improve one or both of operability and a degree of freedom for design.

An operation input device according to the present invention comprises:
an operation member which is operated by a plurality of user's fingers; and
a computer adapted to process the operation input to the operation member to control at least one operation target device, wherein the operation member includes a finger sensor which detects each of the plurality of fingers gripping the operation member, and
the computer specifies the number of gripping fingers which is the number of the fingers gripping the operation member based on the detection result of the finger sensor and switches, in accordance with the number of gripping fingers, a type of an operation command between different types of those (in other words, different kinds of information including different modes, items, contents, or the like, to be operated, selected, or switched by the user, which typically are preset in each operation command to control the target device) in response to the operation input.

According to the present invention, the computer specifies the number of fingers gripping the operation member (the number of gripping fingers) based on the detection result of the finger sensor and switches, in accordance with the number of gripping fingers, a type of an operation command corresponding to the operation input to the operation member. With this arrangement, user can constantly switch the type of the operation command corresponding to the operation input to the operation member only by changing the number of gripping fingers. In other words, user can switch the type of the operation command even without a display device such as a touch panel to input the contents of the operation command (however, it is also possible to use such a display device). Thus, the operability of the operation target device can be improved.

Further, according to the present invention, the finger sensor for detecting each of a plurality of fingers gripping the operation member is included in the operation member. In other words, the finger sensor is physically integrated with the operation member. Therefore, as compared with a configuration of Patent Document 1 (the structure in which the touch pad 23 is physically separated from the dial 41), the degree of freedom for design can be enhanced.

The operation member can be, for example, a dial switch. In the case of the dial switch, since operation is made easy even though the number of gripping fingers changes, the user can easily switch the type of the operation command by changing the number of gripping fingers.

The computer may select the type of the operation command in accordance with the number of gripping fingers and then, switch the contents of the operation command in accordance with an operation amount of the operation member. With this, in a series of the flow of a contact by the finger to the operation member and the operation of the operation member, it is possible to perform selection of the type of the operation command and switching of the contents of the operation command. In this manner, the convenience of the user can be enhanced.

The operation input device may be provided with a reaction generating device which imparts a reaction force to the operation member. Also, the computer may vary the size of the reaction force in accordance with the number of gripping fingers. According to this structure, the user, by recognizing a difference of the reaction force, can know how many fingers are now recognized by the operation input device. Further, usage of the reaction force easily remains in user's memory. Still further, since the stronger the reaction force, the finer adjustment of the operation amount of the operation member, if the reaction force is properly set, the operability of the operation member can be enhanced. Accordingly, the convenience of the user can also be improved.

The computer may vary, in accordance with the number of gripping fingers, the number of notches which show a numerical value or the number of states to be switchable by the operation member. With this, by flexibly switching the number of notches in accordance with the type of operation command which is specified by the number of gripping fingers, it is possible to improve the convenience of the user.

The computer may increase the number of notches along with an increase in the number of gripping fingers. Generally, the larger the number of gripping fingers, it is possible to finely operate the operation member. According to the present invention, since the larger the number of fingers (the number of gripping fingers) contacting the operation member, the larger the number of notches, the convenience of the user can be improved by associating the operation capability of the fingers according to the number of gripping fingers with the number of notches.

The computer, when judged that the operation member is stopped or a predetermined period of time has elapsed since the operation member has been stopped, may permit, switching of the type of the operation command. Further, the computer, when judged that the operation member is moving or a predetermined period of time has not elapsed since the operation member has been stopped, may prohibit switching of the type of the operation command. With this, in the case where the number of gripping fingers varies without the user's intention, the convenience of user can be improved by maintaining (or without switching) the type of the operation command.

The operation input device may be provided with a vibration generating device which imparts vibration to the operation member. Also, the computer may cause the vibration generating device to generate the vibration corresponding to the number of gripping fingers. With this, user, by recognizing a difference of vibration, can know how many fingers are recognized at the moment. Further, usage of vibration easily remains in the user's memory. Thus, the convenience of user can be improved.

The operation member may be provided with an indicator adapted to notify the number of gripping fingers by means of light emission or a display. With this arrangement, user can know how many fingers are recognized at the moment through the light emission or display of the indicator. Accordingly, the convenience of the user can be improved.

Effect of the Invention

According to the present invention, one or both of operability and a degree of freedom for design of the operation input device can be improved.

BRIEF DESCRIPTION OF THE DRAWINGS

FIG. 3A is a view showing a state in which the operation switch of the embodiment stated above is operated by two fingers of a user, while

DETAILED DESCRIPTION OR THE INVENTION

A. One Embodiment

<A-1. Structure
[A-1-1. Overall Structure]

Figure 1:
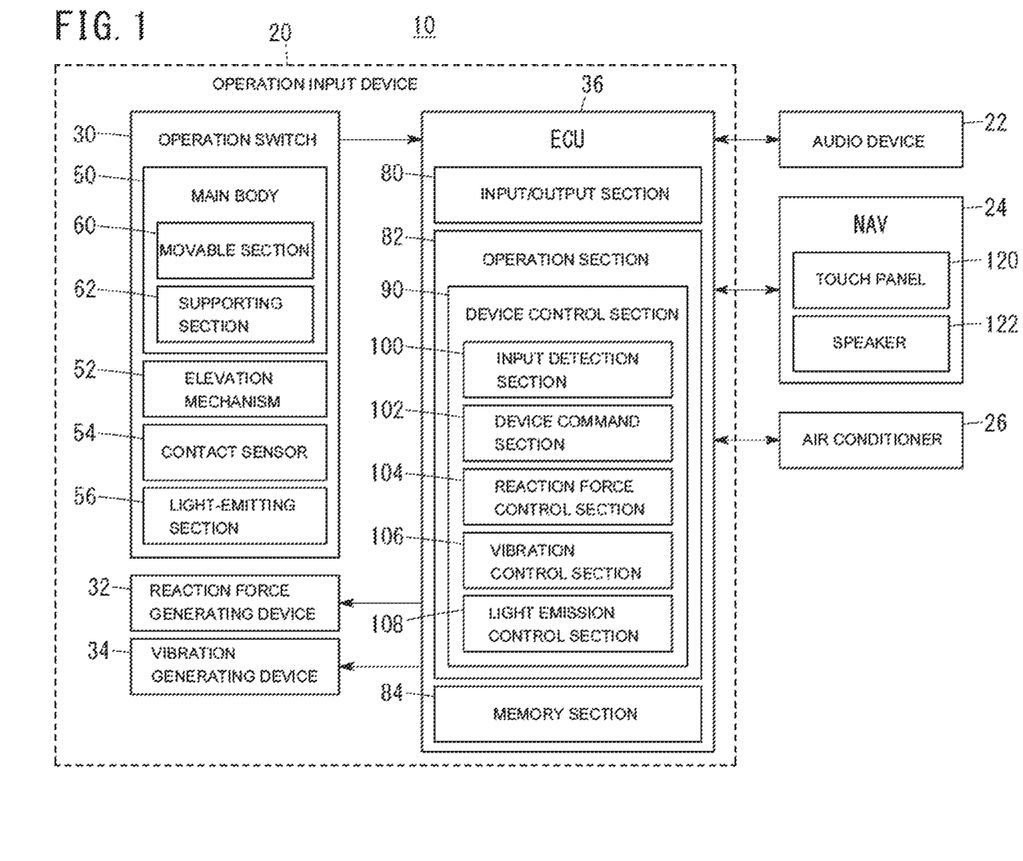
FIG. 1 is a general block diagram of a vehicle equipped with an operation input device according to one embodiment of the present invention.

FIG. 1 is a general block diagram of a vehicle 10 equipped with an operation input device 20 (hereinafter also referred to as "input device 20") according to one embodiment of the present invention. The vehicle 10 includes an audio device 22, a navigation device 24 and an air conditioner 26 as well as the input device 20. The audio device 22, the navigation device 24 and the air conditioner 26 are respectively positioned as a operation target device Otar (or an in-vehicle device) which are controlled by the input device 20.

[A-1-2. Operation Input Device 20]
(A-1-2-1. Outline of Operation Input Device 20)

The operation input device 20 receives an operation input from a user (in particular, a driver) and outputs an operation command corresponding to the operation input to the corresponding operation target device Otar. As shown in FIG. 1, the input device 20 has an operation switch 30, a reaction force generating device 32, a vibration generating device 34, and an electronic control unit 36 (hereinafter referred to as "ECU 36"). Further, in FIGS. 1, 4 and 5, "switch" is abbreviated to "SW".

(A-1-2-2. Operation Switch 30)
(A-1-2-2-1. Outline of Operation Switch 30)

Figure 2A:
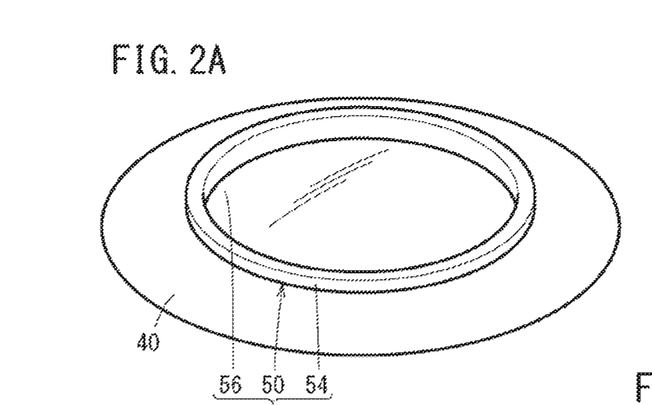
FIGS. 2A to 2C are views showing the first to third states of an operation switch of the embodiment stated above.
Figure 2B:
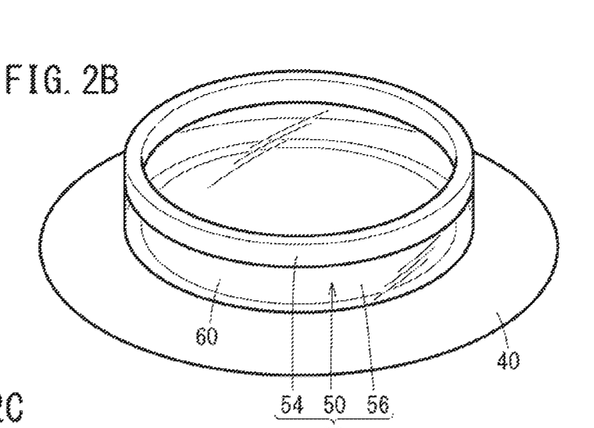
Figure 2C:
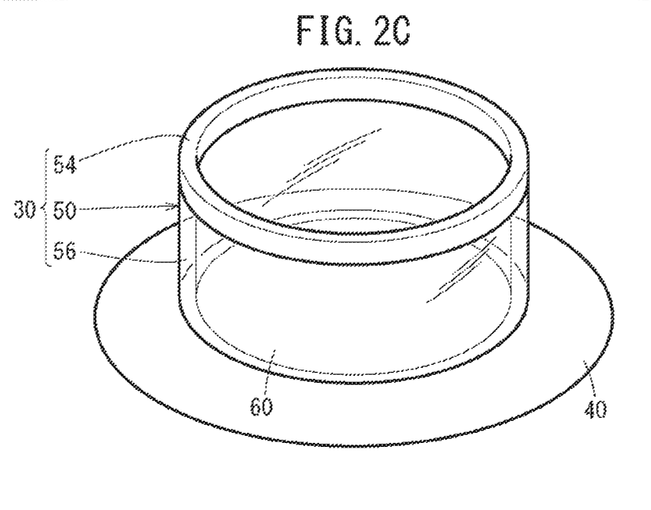

FIGS. 2A to 2C are views showing the first to third states of the operation switch 30 of the present embodiment. The first state as shown in FIG. 2A is a state in which part of the operation switch 30 (part of a main body 50 stated later) is housed within a peripheral member 40 (e.g., an instrument panel). The second state as shown in FIG. 2B is a half-way state in which part of the operation switch 30 (part of the main body 50) is projecting from the peripheral member 40. The third state as shown in FIG. 2C is a state in which the projection of part of the operation switch 30 (part of the main body 50) relative to the peripheral member 40 has completed (i.e., a normal state of use).

Figure 3A:
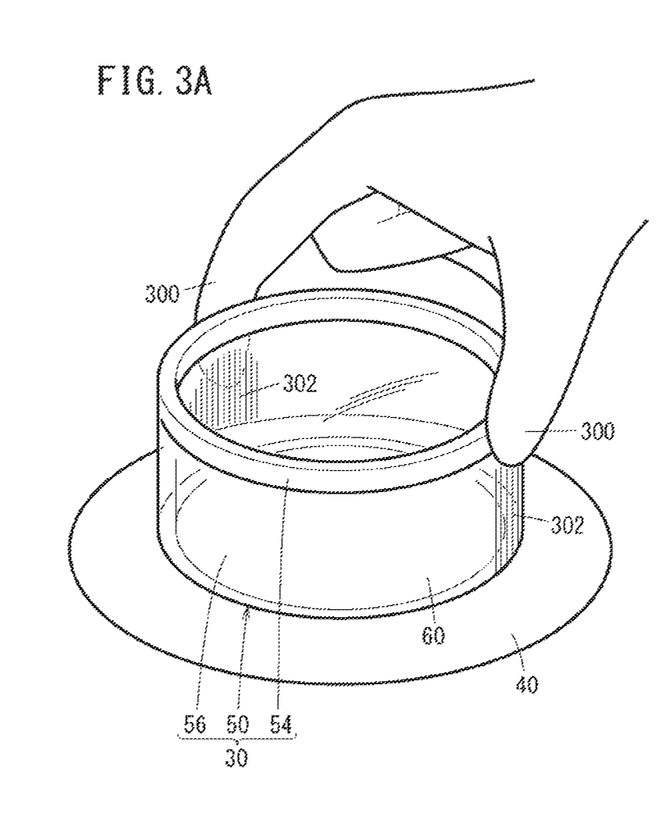
Figure 3B:
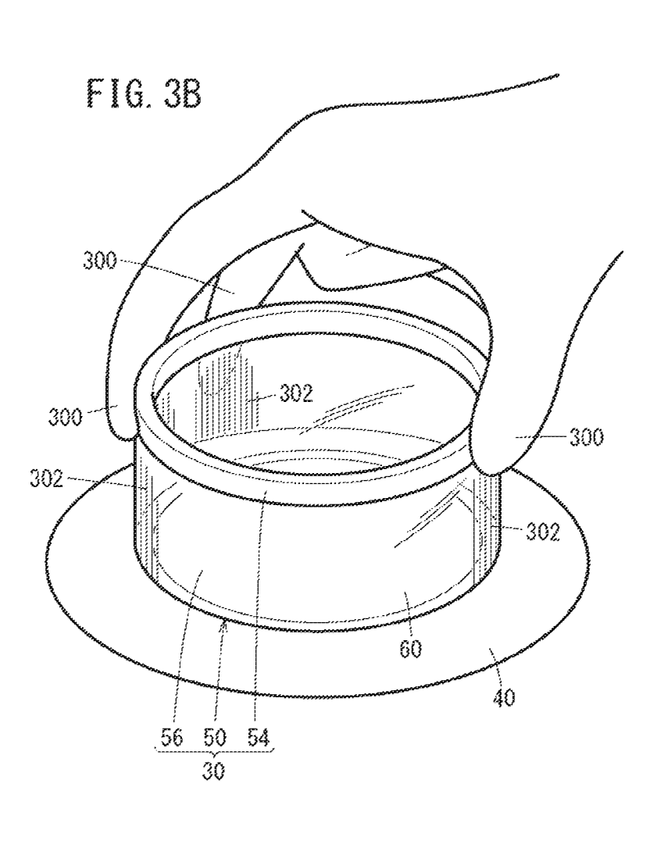
FIG. 3B is a view shoving a state in which the operation switch of the embodiment stated above is operated by three fingers of the user.

FIG. 3A is a view showing a state in which the operation switch 30 of the present embodiment is operated with two fingers of the user. FIG. 3B is a view showing a state in which the operation switch 30 of the present embodiment is operated with three fingers of the user.

The operation switch 30 (the operation member) is an input means for receiving the operation input, of a user (in particular, a driver) to operate a specific function of the operation target device Otar. The operation target device of the present embodiment includes the audio device 22, the navigation device 24, and the air conditioner 26. In other words, the operation switch 30 functions as an audio switch, a navigation switch, and an air conditioner switch. However, other operation target devices Otar may be set. Switching of the operation target device Otar is performed, for example, through a touch panel 120 (see FIG. 1) of the navigation device 24. The operation of the operation target device Otar using the operation switch 30 will be described later with reference to FIG. 5 etc.

As shown in FIG. 3A and the like, the operation switch 30 is a dial switch (or a rotary switch). Also, as shown in FIG. 1 and the like, the operation switch 30 is provided with a main body 50, an elevation mechanism 52, a contact sensor 54, and a light-emitting section 56.

(A-1-2-2-2. Main Body 50)

The main body 50 has a dial movable section 60 (see FIG. 1 etc.) operated by a plurality of user's fingers 300 and a supporting section 62 (FIG. 1) adapted to rot at ably support the movable section 60. It is to be noted that, in FIGS. 2A to 3B, the supporting section 62 is not shown because it is located within the peripheral member 40.

As shown in FIG. 2C, the dial movable section 60 (hereinafter also referred to as "movable section 60") of the present embodiment is a cylindrical member and has an opening to the user's side. Alternatively, the movable section 60 may be blocked without having an opening to the user's side. Or, the movable section 60 is made transparent except for a section where a contact sensor 54 is formed. Or, the movable section 60 may be semi-transparent or light-permeable except for a section where the contact sensor 54 is formed. Or, the movable section 60 may not have light permeability as a whole. Or, the contact sensor 54 may be made transparent.

(A-1-2-2-3. Elevation Mechanism 52)

The elevation mechanism 52 is provided with a motor and the like for elevation (not shown) to elevate or lower the main body 50 (i.e., the movable section 60 and the supporting section 62). In the present embodiment, when a driving source (not shown) of the vehicle 10 is OFF, the elevation mechanism 52 allows the main body 50 to lower based on a command from the ECO 36 to a state in which the main body 50 is housed within the peripheral member 40 (FIG. 2A). Further, when the driving source is ON, the elevation mechanism 52 allows the main body 50 to elevate based on a command from the ECU 36 to a state in which the main body 50 projects from the peripheral member 40 (FIGS. 2B and 2C).

(A-1-2-2-4. Contact Sensor 54)

The contact sensor 54 (the finger sensor) is formed as part of the movable section 60 (only the upper side of the movable section 60). Alternatively, the contact sensor 54 may be formed on the whole side of the movable section 60. The contact sensor 54 detects each contact position of a plurality of fingers 300 gripping the movable section 60. In FIGS. 3A and 3B, the contact sensor 54 detects a state in which the fingers 300 grip the upper outside of the movable section 60, but the contact sensor 54 may detect a state in which the fingers 300 are in contact with the inner surface of the movable section 60. The contact sensor 54 can be composed of, for example, a pressure sensor, an electrostatic capacitance sensor or the like.

(A-1-2-2-5. Light-Emitting Section 56)

The light-emitting section 56 (indicator) is formed as part of the movable section 60 and emits light in response to each contact position of a plurality of fingers 300 gripping the movable section 60. In FIGS. 3A and 3B, reference numeral 302 denotes a region (a light emitting region 302) where a light-emitting section 56 emits light in association with the contact of the fingers 300. The light-emitting section 56 can be composed of a self light-emitting element such as an organic electroluminescence (an organic EL). Or, the light-emitting section 56 may also be composed of a member which emits light by allowing a light-emitting element located on the periphery of the movable section 60 to be incident.

(A-1-2-3. Reaction Force Generating Device 32)

The reaction force generating device 32 imparts a reaction force Fr [Nm] to the operation switch 30 (in particular, movable section 60) based on a command from the ECO 36. In the present embodiment, the reaction force Fr is switched in accordance with the number of fingers 300 gripping the movable section 60. The reaction force generating device 32 has, for example, a motor (a reaction motor) for generating a reaction force and the like.

(A-1-2-4. Vibration Generating Device 34)

The vibration generating device 34, when the user's finger 300 grips the movable section 60, generates vibration V in a pattern corresponding to the number of fingers 300 Ngf based on a command from the ECU 36 and imparts it to the operation switch 30 (in particular, the movable section 60). The vibration generating device 34 has, for example, a motor (a vibration motor) and the like for generating the vibration V.

(A-1-2-5. ECU 36)

The ECU 36 is a computer (a controller) which controls not only the whole of the operation input device 20, but also each operation target device Otar. As shown in FIG. 1, the ECU has an input/output section 80, an operation section 82, and a memory section 84. The input/output section 80 performs input/output of signals between the ECU 36 and the other sections (e.g., an operation switch 30).

The operation section 82 executes a program stored in the memory section 84 to control the whole of the input device 20 and is composed, for example, of a central processing unit (CPU). The operation section 82 has a plurality of device control sections 90 corresponding to each of the audio device 22, the navigation device 24, and the air conditioner 26. In FIG. 1, it is to be noted that only one device control section 90 is shown and illustration of the other device control sections 90 is omitted.

The device control section 90 for the audio device 22 (an audio control section), when the audio device 22 is selected as the operation target device Otar, controls the audio device 22 based on the operation input by the user to the operation switch 30. The device control section 90 for the navigation device 24 (a navigation control section), when the navigation device 24 is selected as the operation target device Otar, controls the navigation device 24 based on the operation input by the user to the operation switch 30. The device control section 90 for the air conditioner 26 (an air conditioner control section), when the stir conditioner 26 is selected as the operation target device Otar, controls the air conditioner 26 based on the operation input by the user to operation switch 30.

As shown in FIG. 1, each device control section 90 has an input detection section 100, a device command section 102, a reaction force control section 104, a vibration control section 106, and a light emission control section 108. The input-detection section 100 detects the operation input by the user to the operation switch 30. For example, the device control section 90 for the audio device 22 (the audio control section) detects the operation input by the user to the operation switch 30.

The device command section 102 transmits a control command to the operation target device Otar based on the operation input detected by at the input detection section 100 to control the operation target device Otar. The reaction force control section 104 controls a reaction force Fr generated at the reaction force generation device 32. The vibration control section 106 controls vibration V generated at the vibration generating device 34. The light emission control section 108 controls the emission of light in the light-emitting section 56. The details will be described later with reference to FIGS. 4 and 5, etc.

The memory section 84 (see FIG. 1) stores programs and data which are used by the operation section 82. The memory section 84 is provided, for example, with a random access memory (hereinafter referred to as "RAM"). A volatile memory such as register and a non-volatile memory such as a flash memory can be used as the RAM. Further, the memory section 84 may also be provided with a read-only memory (hereinafter referred to as "ROM") as well as the RAM.

It is assumed in the present embodiment that the operation input device 20 is mounted on (or always fixed to) the vehicle 10, but it may also be portable outside the vehicle 10 like, for example, a smart phone.

<A-2. Control>

[A-2-1. Common Flow]

Figure 4:
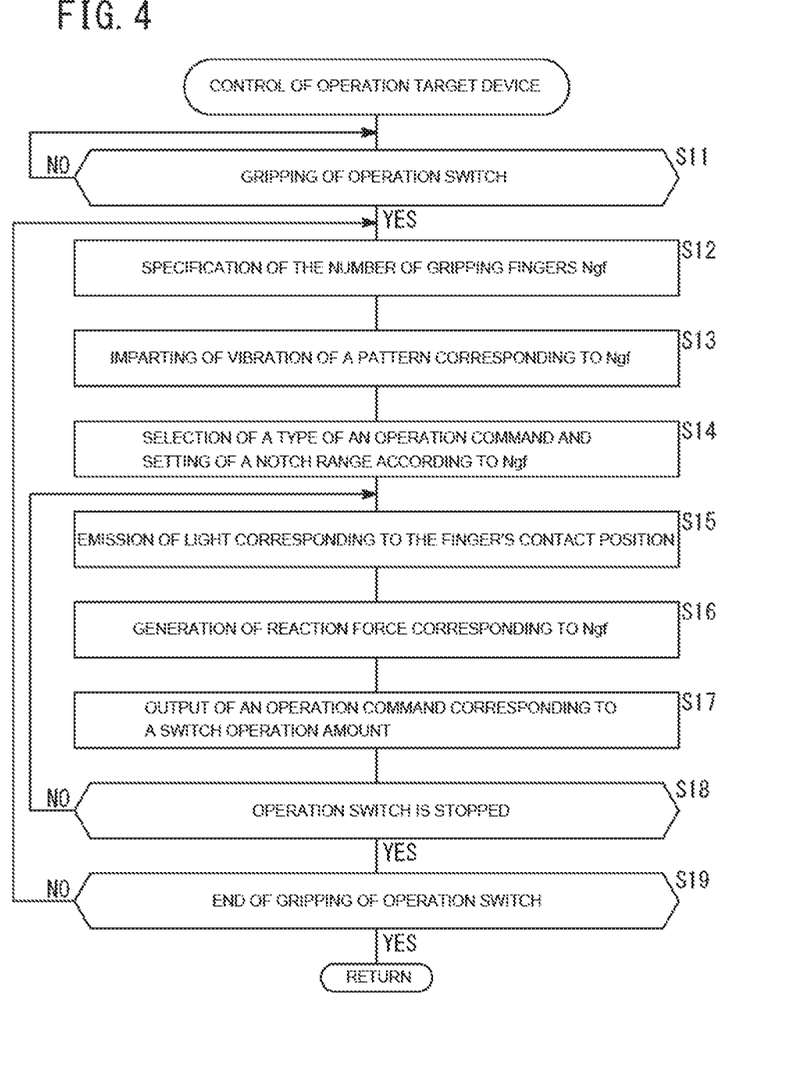
FIG. 4 is a flow chart in which an operation target device is controlled by means of the operation input device of the embodiment stated above.
Figure 5:
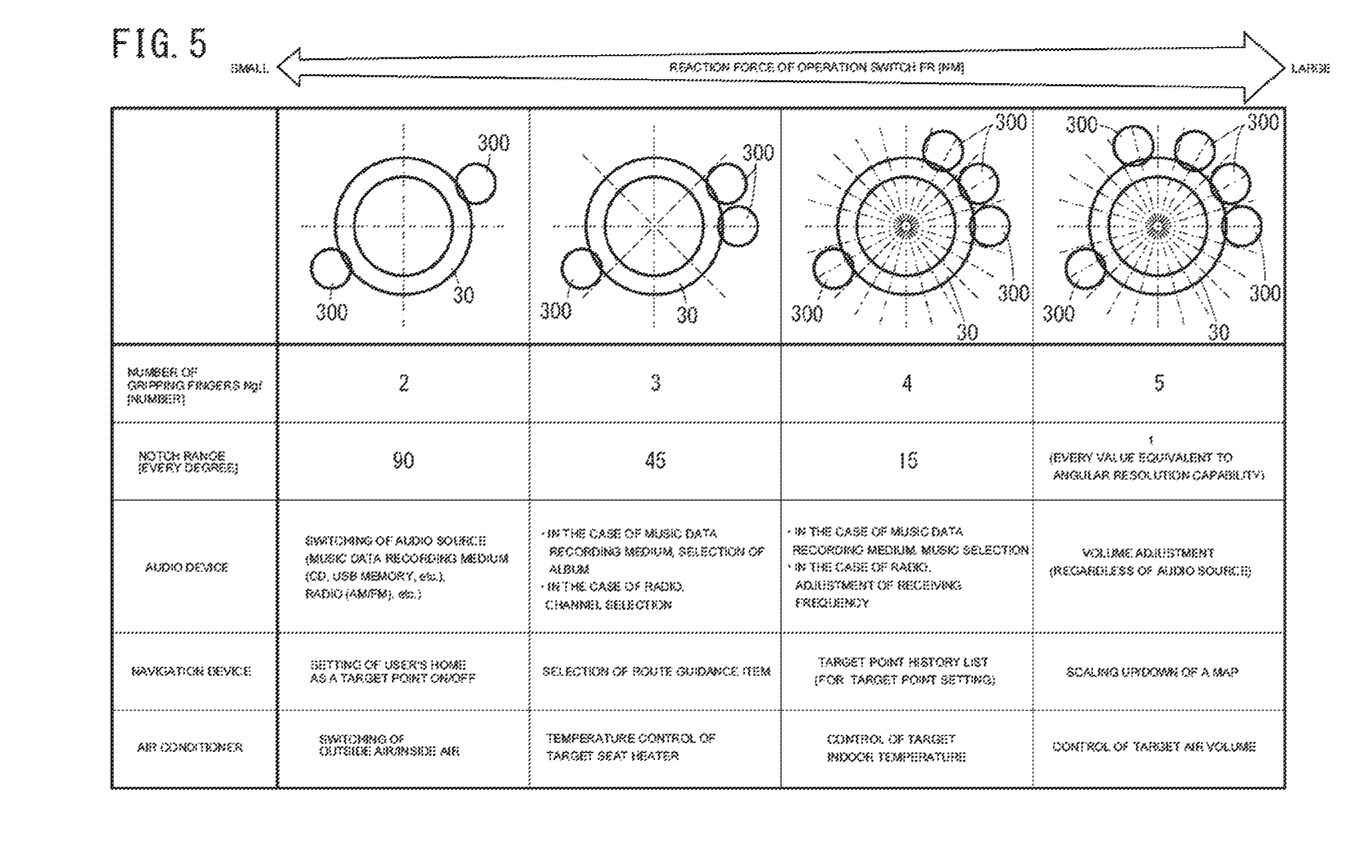
FIG. 5 is a view for explaining an operation of the operation switch of the embodiment stated above.

FIG. 4 is a flow chart in which the operation target device Otar is controlled by means of the operation input device 20 of the present embodiment. Before starting the control of FIG. 4, the operation target device Otar (the audio device 22, the navigation device 24, or the air conditioner 26) is selected through the touch panel 120. Each of steps S11 to S19 of FIG. 4 is executed by the operation section 82 of the input device 20. Each of steps S11 to S19 of FIG. 4 is used in common by the audio device 22, the navigation device 24 and the air conditioner 26 serving as the operation target device Otar. FIG. 5 is a view for explaining the operation of the operation switch 30 of the present embodiment.

In step S11 of FIG. 4, the input device 20 judges whether or not the operation switch 30 is gripped by a plurality of user's fingers 300. The judgment is made using the output of the contact sensor 54. Specifically, the input detection section 100 (see FIG. 1) receives input, signals from the operation switch 30 and judges a position on whether or not there is a contact (or gripping) of the finger 300 to the contact sensor 54.

Here, the contact of the finger 300 to the contact sensor 54 is judged as "gripping". In other words, the judgment is made on the assumption that there is no contact, only in one place. Alternatively, gripping may be judged on the condition that there are two or more contact positions (in other words, after confirming the number of contact positions in step S12 stated below). In the case where the operation switch 30 is gripped (S11: YES), proceed to step S12. If the operation switch 30 is not gripped (S11: NO), step S11 is repeated.

In step S12, the input device 20 specifies the number of fingers 300 Ngf (hereinafter also referred to as "number of gripping fingers Ngf") gripping the operation switch 30. Specifically, the input detection section 100 judges whether or not the number of contact positions judged based on the input signals from the operation switch 30 is two or more.

In step S13, the vibration control section 106 of the input device 20 imparts vibration V of a pattern corresponding to the number of gripping fingers Ngf. With this, user can recognize the number of gripping fingers Ngf [and a type of the operation command corresponding to this (stated below)] recognized by the input device 20.

In step S14, the device command section 102 (see FIG. 1) of the input device 20 selects a type of the operation command, in accordance with the number of gripping fingers Ngf and sets a notch range Rn in accordance with the type of the operation command. For example, as the type of operation command of the audio device 22, there are switching of an audio source, selection of an album, selection of music, adjustment of volume, etc. (The details will be described below with reference to FIG. 5), which include different items or contents to be operated and selected in each type or mode.

Further, the notch range Rn is a degree of the operation amount Dd of the operation switch 30 corresponding to the contents of the same operation command. In other words, the notch range Rn shows a notch distance. Still further, the notch range Rn relates to the number of notches Nn which shows a numerical value or the number of states to be switched by the operation switch 30 (the operation member) (Details will be described below with reference to FIG. 5).

For example, in the case where the number of gripping fingers Ngf is two (2), the notch range Rn is 90° and the contents of the operation command are switched every 90°. For example, in the case of the audio device 22, the audio source is switched every time when the operation switch 30 is rotated by 90°. In the present embodiment, the larger the number of gripping fingers Ngf, the narrower the notch range Rn.

In step S15 of FIG. 4, the light emission control section 108 (FIG. 1) of the input device 20 causes the light-emitting section 56 to emit light in response to the contact position Pc of the gripping fingers 300. For example, in the case where the number of gripping fingers Ngf is two (2), light is caused to emit at two places of the light-emitting section 56 in response to the position of two fingers 300 which grip the operation switch 30 (refer to two light emitting regions 302 of FIG. 3A). Further, in the case where the number of gripping fingers Ngf is three (3), light is caused to emit at three places of the light-emitting section 56 in response to the position of the three fingers 300 which grip the operation switch 30 (refer to three light emitting regions 302 of FIG. 3B). It is also true in the case where the number of gripping fingers 300 Ngf is four (4) and five (5).

In step S16, the reaction force control section 104 (FIG. 1) of the input device 20 generates a reaction force Fr in accordance with the number of gripping fingers Ngf. Specifically, as shown on the upper side of FIG. 5, the reaction force control section 104 is provided in such a manner that the larger the number of gripping fingers Ngf, the larger the reaction force Fr acting on the operation switch 30.

In step S17, the device command section 102 (FIG. 1) of the input device 20 outputs the operation command corresponding to a switch operation amount Dd. In step S18, the input device 20 judges whether or not the operation switch 30 which is an operation target is stopped. If the operation switch 30 is not stopped (S18: NO), return to Step 15. In this case, since step S14 is no longer performed, it is to be noted that the type of the operation command and the notch range Rn are maintained. If the operation switch 30 is stopped (S18: YES), proceed to Step 19.

In Step S19, the input device 20 judges whether or not gripping of the operation switch 30 which is an operation target is completed. If gripping of the operation switch 30 is not completed (S19: NO), return to Step 12. In this case, since Steps S12 to S14 are newly performed, it is to be noted that the type of the operation command and the notch range Rn are switchable. In the case where gripping of the operation switch 30 which is an operation target is completed (S19: YES), finish the present control of FIG. 4 and start the control from Step S11 after a predetermined period of time.

[A-2-2. Selection of the Type of the Operation Command and Setting of the Notch Range Rn According to the Number of Gripping Fingers Ngf]

(A-2-2-1. In the Case Where the Operation Target Otar is the Audio Device 22)

As shown in FIG. 5, in the case where the operation target device Otar is the audio device 22 and the number of gripping fingers Ngf of the operation switch 30 is two (2), the input device 20 performs switching of the audio source according to the operation amount Dd of the operation switch 30. The audio source here includes, for example, a music data recording medium and a radio. The music data recording medium can include, for example, a compact disc (CD), a universe serial bus (USB), a memory, etc. Further, the radio can include an AM broadcast and a FM broadcast.

As shown in FIG. 5, in the case where the number of gripping fingers Ngf is two (2), the audio source is switched every time when the operation amount Dd is, for example, 90°. In other words, the notch range Rn is set every 90°. In the case where the number of the audio sources is comparatively large, the notch range Rn may be set narrower than 90° to increase the number of alternatives.

In a state in which a specific music data receding medium is selected as the audio source, if the number of gripping fingers Ngf of the operation switch 30 is three (3), the input device 20 performs selection of an album according to the operation amount Dd of the operation switch 30. In a state in which the radio is selected as the audio source, if the number of gripping fingers Ngf of the operation switch 30 is three (3), the input device 20 performs channel selection.

As shown in FIG. 5, in the case where the number of gripping fingers Ngf is three (3), the audio source is switched every time when the operation amount Dd is, for example, 45°. In other words, the notch range Rn is set every 45°. The notch range Rn in the case where the number of gripping fingers Ngf is three (3) is set narrower than that in the case where the number of gripping fingers Ngf is two (2). When the number of selectable channels (the number of channels) is comparatively large, the notch range Rn may be set narrower than 45° to increase the number of alternatives. A fixed value (default value) can be used for the number of channels. Or, based on the position information acquired by the navigation device 24, the navigation device 24 or the input device 20 judges the number of channels and the input device 20 may increase or decrease the notch range Rn according to the number of channels.

In a state in which a specific music data recording medium is selected as the audio source, if the number of gripping fingers Ngf of the operation switch 30 is four (4), the input device 20 performs selection of a music piece according to the operation amount Dd of the operation switch 30. The music selection here is performed from among the selected albums. In a state in which a radio is selected as the audio source, if the number of gripping fingers Ngf of the operation switch 30 is four (4), the input device 20 makes adjustment of a receiving frequency.

As shown in FIG. 5, in the case where the number of gripping finger Ngf is four (4), the audio source is switched every time when the operation amount Dd is, for example, 15°. In other words, the notch range Rn is set every 15°. The notch range Rn in the case where the number of gripping fingers Ngf is four (4) is set narrower than that in the case where the number of gripping fingers Ngf is three (3). However, if the number of selectable songs is comparatively large, the notch range Rn may be set narrower than 15° to increase the number of alternatives.

In the case where the number of gripping fingers Ngf of the operation switch 30 is five (5), the input device 20, irrespective of the contents of the audio source, makes adjustment of the sound volume according to the operation amount Dd of the operation switch 30. That is, when the operation switch 30 is turned clockwise as seen from the user, the sound volume is caused to increase, while, when turned counterclockwise, volume sound is caused to decrease. In this case, the notch range Rn of the operation switch 30 is caused to match to an angular resolution capability of the operation switch 30. For example, in the case where the operation amount Dd of the operation switch 30 is detectable every 1°, the notch range Rn becomes 1°.

(A-2-2-2. In the Case Where the Operation Target Device Otar is the Navigation Device 24)

As shown in FIG. 5, in the case where the operation target device Otar is the navigation device 24 and the number of gripping fingers Ngf of the operation switch 30 is two (2), the input device 20 performs ON/OFF for setting a user's home as a target point. That is, in a state in which the number of gripping finger Ngf of the operation switch 30 is two (2), when the user turns the operation switch 30, the ON/OFF of the user's home setting is switched, for example, every 90°. It is to be noted that user's home is required to be set in advance using the touch panel 120 of the navigation device 24.

In the case where the number of gripping fingers Ngf of the operation switch 30 is three (3), the input device 20 performs selection of a route guide item according to the operation amount Dd of the operation switch 30 (every 45°). The route guide item can include, for example, a display or a guide sign such as a gas station and a convenience store.

In the case where the number of gripping fingers Ngf of the operation switch 30 is four (4), the input device 20 displays a target point history list and performs selection of the target point according to the operation amount Dd of the operation switch 30 (every 15°). The target point history list is one that recites the target points set in the past and displayed on the touch panel 120. In the target point history list on the touch panel 120, a single target point is made a selected state (an active state). The input device 20 instructs the navigation device 24 to set a target point which was a selected state at the time when gripping of the operation switch 30 is finished, as a new target point. It is to be noted that the target point history list displays not only a plurality of target points, but also an alternative for cancellation.

In the case where the number of gripping fingers Ngf of the operation switch 30 is five (5), the input device 20 scales up or down a map which is displayed, on the touch panel 120. For example, when the operation switch 30 is turned clockwise as seen from the user, the input device 20 scales up the map, while when turned counterclockwise, it scales down the map. In this case, the notch range Rn of the operation switch 30 is caused to match to the angular resolution capability of the operation switch 30. For example, if the operation amount Dd of the operation switch 30 is detectable every 1°, the notch range Rn becomes 1°.

Even in each case where the number of gripping fingers Ngf of the operation switch 30 is two (2) to five (5), the notch range Rn is changeable as appropriate and it is the same as in the case of the operation switch 30. However, even though the number of gripping fingers Ngf is the same, the notch range Rn may be different in the case where the operation target, device Otar is the audio device 22 or the navigation device 24

(A-2-2-3. In the Case Where the Operation Target Device Otar is the Air Conditioner 26)

As shown in FIG. 5, in the case where the operation target device Otar is the air conditioner 26 and the number of gripping fingers Ngf of the operation switch 30 is two (2), the input device 20 performs switching operation of outside air/inside air for intake air of the air conditioner 26. That is, in a state in which the number of gripping fingers Ngf of the operation switch 30 is two (2), if the user turns the operation switch 30, outside air is switched to inside air, for example, every 90°.

When the number of gripping fingers Ngf of the operation switch 30 is three (3), the input device 20 makes adjustment of a target seat heater temperature according to the operation amount Dd of the operation switch 30 (every 45°). In the present embodiment, the target seat heater temperature is classified into four (4) levels. For example, when the operation switch 30 is turned clockwise as seen from the user, the target seat heater temperature is raised. Even though the operation switch is turned further clockwise in a state in which it is set to a maximum heating temperature, the maximum heating temperature remain unchanged. In the case where the operation switch 30 is turned counterclockwise, the target seat heater temperature is decreased. Even though the operation switch is turned further counterclockwise in a state in which it is set to a minimum heating temperature, the minimum heating temperature remain unchanged.

In the case where the number of gripping fingers Ngf of the operation switch 30 is four (4), the input device 20 makes adjustment of an indoor target temperature. In the present embodiment, the indoor target temperature is classified into 12 levels. For example, when the operation switch 30 is turned clockwise as seen from the user, the indoor target temperature is raised. Even though the operation switch is turned further clockwise in a state in which it is set to an indoor maximum temperature, the indoor maximum temperature remains unchanged. When the operation switch 30 is turned counterclockwise, the indoor target temperature is decreased. Even though the operation switch is turned further counterclockwise in a state in which it is set to the indoor minimum temperature, the indoor minimum temperature remains unchanged.

In the case where the number of gripping fingers Ngf of the operation switch 30 is five (5), the input device 20 makes adjustment of a target wind quantity. For example, when the operation switch 30 is turned clockwise as seen from the user, the target wind quantity is increased, while when turned counterclockwise, the target wind quantity is decreased. In this case, the notch range Rn of the operation switch 30 is caused to match to the angular resolution capability of the operation switch 30. For example, when the operation amount Dd of the operation switch 30 is detectable every 1°, the notch range Rn becomes 1°.

Even in each case where the number of gripping fingers Ngf of the operation switch 30 is two (2) to five (5), the notch range Rn is changeable as appropriate and this is the same as in the case where the operation target device Otar is the audio device 22 or the navigation device 24. However, even though the number of gripping fingers Ngf is the same, the notch range Rn may be different in the case where the operation target device Otar is the audio device 22 or the navigation device 24.

<A-3. Effect of the Present Embodiments

As described above, according to the present embodiment, the number of fingers 300 (the number of gripping fingers Ngf) which grip the operation switch 30 (operation member) based on the contact position (a detection result) of the finger 300 detected by the contact sensor 54 (the finger sensor) is specified and the type of operation command corresponding to the operation input to the operation switch 30 is switched according to the number of gripping fingers Ngf (see S12 and S14 of FIG. 4, and FIG. 5). With this, the user, only by changing the number of gripping fingers Ngf, can constantly switch the type of operation command corresponding to the operation input to the operation switch 30. In other words, even without a display device such as the touch panel 120, it is possible to switch the type of operation command to input the contents of operation command (Of course, such a display device can also be used). Accordingly, operability of the operation target device Otar can be improved.

Further, according to the present embodiment, the contact sensor 54 adapted to detect the contact position of each of the plurality of fingers 300 which grip the operation switch 30 is included in the operation switch 30 (see FIG. 2C, etc.). In other words, the contact sensor 54 is physically integrated with the operation switch 30. Therefore, as compared to the structure of Patent Document 1 (in which a touch pad 23 is physically separated from a dial 41), a degree of freedom for design can be enhanced.

In the present embodiment, the operation switch 30 (the operation member) is a dial switch (see FIG. 2C, etc.). In the case of the dial switch, the operation is easy even though the number of gripping fingers Ngf changes. As a result, the user can easily switch the type of operation command by changing the number of gripping fingers Ngf.

In the present embodiment, the ECU 36 (the computer) selects the type of operation command according to the number of gripping fingers Ngf and then, switches the contents of operation command according to the operation amount Dd of the operation switch 30 (see S14 and S17 of FIG. 4, and FIG. 5). With this, in a series of the flow of the contact by the finger 300 to the operation switch 30 and the operation of the operation switch 30, selection of the type of the operation command and switching of the contents of the operation command can be performed. Accordingly, the convenience of the user can be improved.

In the present embodiment, the operation input device 20 is provided with the reaction force generating device 32 for imparting a reaction force Fr to the operation switch 30 (the operation member) (see FIG. 1). Further, the ECU 36 (the computer) varies the size of the reaction force Fr according to the number of gripping fingers Ngf (See S16 of FIG. 4, and FIG. 5). With this, the user, by recognizing the difference of reaction force Fr, can know how many fingers 300 are recognized at the moment. Further, by using the reaction force Fr, it easily remains in the user's memory. Still further, since the stronger the reaction force Fr, the finer the adjustment of the operation amount Dd of the operation switch 30, if the reaction force is properly set, operability of the operation switch 30 can be enhanced. Accordingly, the convenience of the user can be improved.

In the present embodiment, the ECU 36 (computer) varies, according to the number of gripping fingers Ngf, the notch range Rn (and the number of notches Nn associated with the notch range Rn) prescribing the number of notches Nn which shows a numerical value or the number of states changeable by the operation switch 30 (operation member) (S14 of FIG. 4, and FIG. 5). With this, by flexibly switching the notch range Rn or the number of notches Nn according to the type of operation command specified by the number of gripping fingers Ngf, the convenience of the user can be improved.

In the present embodiment, the larger the number of gripping fingers Ngf, the narrower the notch range Rn, the ECU 36 (computer) increases the number of notches Nn (see S14 of FIG. 4, and FIG. 5). Generally, the larger the number of gripping fingers Ngf, the operation switch 30 (operation member) can be finely operated. According to the present embodiment, the larger the number of fingers 300 (the number of gripping fingers Ngf) touching the operation switch 30, the larger the number of notches Nn. Thus, by relating the operation capability of the finger 300 associated with the number of gripping fingers Ngf to the number of notches Nn, the convenience of the user can be improved.

In the present embodiment, the ECU 36 (computer), when judged that the operation switch 30 (operation member) is stopped (S18 of FIG. 4: YES), permits switching of the type of operation command (S19: NO→S12→S13). Further, the ECU 36, when judged that the operation switch 30 is moving (S18 of FIG. 4: NO), inhibit switching of the type of operation command by repeating steps S15 to S18. With this, in the case where the number of gripping fingers Ngf changes against user's intentions, the convenience of the user can be improved by maintaining (or by not switching) the type of operation command.

In the present embodiment, the operation input device 20 is provided with the vibration generating device 34 for imparting vibration V to the operation switch 30 (operation member) (FIG. 1). Further, the ECU 36 (computer) causes the vibration generating device 34 to generate vibration V according to the number of gripping fingers Ngf (S13 of FIG. 4). With this, the user, by recognizing the difference of the vibration V, can know how many fingers 300 are recognized at the moment. Further, by using the vibration V, it easily remains in the user's memory. Accordingly, the convenience of the user can be improved.

In the present embodiment, the operation switch 30 (operation member) is provided with the light-emitting section 56 (the indicator) for notifying the number of gripping fingers Ngf by emission of light (see FIGS. 3A and 3B, and S15 of FIG. 4). With this, the user can know how many fingers 300 are recognized at the moment through the emission of light of the light-emitting section 56. Accordingly, the convenience of the user can be improved.

B. Modifications

It will be appreciated that the present invention is not limited to the embodiment stated above and modifications may be made based on the matters stated in the description. For example, the following constitution can be adopted.

<B-1. Scope of Application>

In the above-mentioned embodiment, the operation input device 20 is applied to the vehicle 10. However, for example, from a viewpoint of switching, according to the number of gripping fingers Ngf, the type of operation command corresponding to the operation input, the operation input device is not limited to the vehicle. For example, the operation input device 20 of the present invention can be applied to a moving object such as a ship and an aircraft. Or, it is not limited to the moving object, but may also be applied to other devices which accept plural kinds of operation inputs.

<B-2. Operation Target Device Otar>

In the above-mentioned embodiment, the audio device 22, the navigation device 24, and the air conditioner 26 are shown as the operation target device Otar (See FIGS. 1 and 5). However, for example, from a viewpoint of switching, according to the number of gripping fingers Ngf, the type of the operation command corresponding to the operation input, the operation target device Otar is not limited to these. For example, in addition to or in place of the audio device 22, the navigation device 24, and the air conditioner 26, a head-up display (HDD), a hazard lamp, an indoor lamp, a defroster, a seat (reclining adjustment, etc.), a door mirror, a backlight, a door window (on a driver's seat side and a passenger seat side), a sun roof, etc. may be considered as the operation target devices Otar.

Alternatively, an electronic control unit (ECU) which controls a driving mode may be considered as the operation target device Otar. In that case, the type of operation command includes a type of the driving mode. As the driving mode, for example, a mode (an energy-saving driving mode, a sports driving mode) concerning a difference due to energy efficiency in the same driving source (such as an engine) is included. Or, a mode (e.g., an engine driving mode, a motor driving mode) regarding the selection of a plurality of driving sources (such as an engine and a drive motor) may be included.

Alternatively, an ECU performing a drive assist control may also be regarded as the operation target device Otar. In that case, as the type of operation command, a type of the drive assist control is included. As the drive assist control, for example, an auto-cruise control (ACC), a lane maintenance assist control, an automatic lane-changing (ALC) control, etc. are included.

In the embodiment stated above, the operation target device Otar were three (3) devices of the audio device 22, the navigation device 24, and the air conditioner 26 (see FIG. 1). However, for example, from a viewpoint of switching, according to the number of gripping fingers Ngf, the type of the operation command corresponding to the operation input, if the number of operation target device Otar is one or more (at least one), then it is acceptable.

<B-3. Operation Switch 30>

In the above-mentioned embodiment, as the operation target device Otar, the audio device 22, the navigation device 24, and the air conditioner 26 are allocated to one operation switch 30 (see FIG. 5). However, for example, from a viewpoint of switching, according to the number of gripping fingers Ngf, the type of operation command corresponding to the operation input, it is not necessarily so. For example, the operation target devices Otar more than two (2) or four (4) may be allocated to one operation switch 30. Or, each of the operation target devices Otar may be allocated to one operation switch 30.

Alternatively, the operation target device Otar may be switched according to the number of gripping fingers Ngf. For example, when the number of gripping fingers Ngf is two (2), the operation target device Otar can be the audio device 22, while the number of gripping fingers Ngf is three (3), the operation target device Otar can be the air conditioner 26. In this case, the correspondence relationship between the number of gripping fingers Ngf and the operation target device Otar may also be switchable by changing the setting through the touch panel 120 and the like. Or, the ECU 36 may switch the operation target device Otar based on sound input through a microphone (not shown).

In the above embodiment, the operation switch 30 is a dial switch (see FIG. 2C, etc.). However, for example, from a viewpoint of switching, according to the number of gripping fingers Ngf, the type of the operation command corresponding to the operation input, it is not necessarily so. For example, a switch such as a slide switch and a lever switch may be used as the operation switch 30.

In the above embodiment, the operation target device Otar corresponding to the operation switch 30 was set by the operation of the touch panel 120. However, for example, from a viewpoint of switching, according to the number of gripping fingers Ngf, the type of operation command corresponding to the operation input, it is not necessarily so. For example, by providing a changeover switch (not shown) for switching the operation target device Otar which becomes a target of the operation switch 30, the operation target device Otar may be set. In that case, the changeover switch is provided to be separately rotatable around a rotation axis common to the operation switch 30 and its diameter may be different from (e.g., smaller diameter than) that of the operation switch 30. Or, one operation switch 30 may be provided for each of the operation target devices Otar.

<B-4. Operation Switch 30 (Operation Member)>

In the above-mentioned embodiment, the operation switch 30 is provided with the elevation mechanism (see FIG. 1). However, for example, from a viewpoint of being operated by the user's plurality of fingers 300, it is not necessarily so and the elevation mechanism may be omitted.

<B-5. Contact Sensor 54 (Finger Sensor)>

In the embodiment stated above, the contact sensor 54 is provided as the finger sensor for detecting each of the plurality of fingers which grip the operation switch 30 (operation member) (see FIGS. 3A and 3B). However, for example, from a viewpoint of getting information of the finger 300 for specifying the number of gripping fingers Ngf, it is not necessarily so. For example, an image sensor (not shown) for imaging the finger 300 may be used as the finger sensor. In this case, the ECU 36 can specify the number of gripping fingers Ngf by performing image processing to an image of the finger 300 acquired by the image sensor (the image in a state gripping the operation switch 30).

<B-6. Selection of the Type of Operation Command>

In the above embodiment, the ECU 36 (computer), when judged that the operation switch 30 (operation member) is stopped (S18 OF FIG. 4: YES), permitted switching of the type of operation command (S19: NO→S12→S13). Further, the ECU 36, when judged that the operation switch 30 is moving (S18 of FIG. 4: NO), prohibited switching of the type of operation command by repeating steps S15 to S18. However, for example, from a viewpoint of permitting or prohibiting switching of the type of operation command according to the user's intention, it is not necessarily so.

For example, the ECU 36, when judged that a predetermined period of time (e.g., any of the values between 0.2 and 1.0 seconds) has elapsed since the operation switch 30 (operation member) was stopped, may permit switching of the type of operation command and the ECU, when judged that the predetermined period of time has not elapsed since the operation switch 30 was stopped, may prohibit switching of the type of operation command.

In the present embodiment, the type of operation command as shown in FIG. 5 was used. However, for example, from a viewpoint of switching, according to the number of gripping fingers Ngf, the type of the operation command corresponding to the operation input, it is not necessarily so. Further, as for the type of operation command, default setting can be changed before operation or during operation using the touch panel 120 and the like.

<B-7. Specification of the Number of Gripping Fingers Ngf>

In the above embodiment, the input detection section 100 of the ECU 36 specified the number of gripping fingers Ngf (see S12 of FIG. 4). However, for example, from a viewpoint of specifying the number of gripping fingers Ngf, it is not necessarily so. For example, if the computer for specifying the number of gripping fingers Ngf is integrated with the operation switch 30 as a unit, the computer may specify the number of gripping fingers Ngf. In other words, part of the functions of the ECU 36 may be provided as a separate body.

<B-8. Notification of the Number of Gripping Fingers Ngf>

In the embodiment stated above, in order to notify the user of the number of gripping fingers Ngf, the reaction force Fr by the reaction generating device 32 (S16 of FIG. 4, and FIG. 5), vibration V by the vibration generating device 34 (S13 of FIG. 4), and emission of light by the light-emitting section 56 (FIGS. 3A and 3B, and S15 of FIG. 4) were used. However, for example, from a viewpoint of notifying the user of the number of gripping fingers Ngf, it is not necessarily so.

For example, the vibration V may be generated by the other section (e.g., a steering handle and a driver's seat) in place of the operation switch 30. Further, the number of gripping fingers Ngf may be notified by the emission of light or a display in the other section (e.g., an indicator such as a meter, HUD, and a touch panel 120) in place of the operation switch 30. In this case, it is also possible to notify the number of gripping fingers Ngf by a display of the numerical value which shows the number of gripping fingers Ngf or by the number of lighting times or the lighting time according to the number of gripping fingers Ngf. Alternatively, it is also possible to omit one or more of the reaction force Fr, vibration V and emission of light. Further, the ECU 36 may cause a speaker 122 to output sound which notifies the number of gripping fingers Ngf.

<B-9. Notch Range Rn (Number of Notches Nn)>

In the embodiment stated above, the larger the number of gripping fingers Ngf, the narrower the notch range Rn. In other words, the larger the number of gripping fingers Ngf, the larger the number of notches Nn (see FIG. 5). However, for example, from a viewpoint of switching, according to the number of gripping fingers Ngf, the type of operation command corresponding to the operation input, it is not necessarily so. For example, the larger the number of gripping fingers Ngf, the wider the notch range Rn or the smaller the number of notches Nn. Or, it is not necessary to associate the number of gripping fingers Ngf with the notch range Rn or the number of notches Nn.

DESCRIPTION OF REFERENCE NUMERALS

20: Operation input device; 22: Audio device (Operation target device); 24: Navigation device (Operation target device); 26: Air conditioner (Operation target device); 30: Operation switch (Operation member); 32: Reaction force generating device; 34: Vibration generating device; 36: ECO (Computer); 54: Contact, sensor (Finger sensor); 56: Light-emitting section (Indicator); 300: Finger; Dd: Operation amount of a dial switch; Fr: Reaction force; Ngf: Number of gripping fingers; Nn: Number of notches; Otar: Operation target device; Pc: Contact, position; V: Vibration

The invention claimed is:

1. An operation input device comprising:
an operation member configured to be gripped and operated by a plurality of user's fingers and to generate an operation input based on the operation by the plurality of the fingers; and
a controller configured to receive and process the operation input so as to control at least one operation target device based on the operation input, wherein
the operation member comprises a finger sensor configured to detect each of the plurality of fingers which are gripping the operation member,
the controller determines a number of the fingers gripping the operation member, based on the detection of the fingers by the finger sensor,
the at least one operation target is controlled by different types of operation commands, each type of the operation commands being operable by the operation input, and
the controller switches, in accordance with the number of the gripping fingers, the types of operation commands to be operated by the operation input for controlling the at least one operation target, wherein the controller sets a number of notches which define positions of the operation member for switching numerical values or a number of states to control the at least one operation target, and the controller changes, in accordance with the number of the gripping fingers, the number of notches corresponding to the numerical values or the number of states to be switched by the operation member.

2. The operation input device according to claim 1, wherein the operation member is a dial switch.

3. The operation input device according to claim 1, wherein the controller selects one of the types of the operation commands to control the at least one operation target in accordance with the number of the gripping fingers, and then, the controller switches contents in the operation command in accordance with an operation amount of the operation member inputted by the user's fingers.

4. The operation input device according to claim 1, wherein the operation input device is provided with a reaction force generating device which generates and applies a reaction force to the operation member in response to the operation by the user's fingers, and the controller varies an amount of the reaction force in accordance with the number of the gripping fingers.

5. The operation input device according to claim 1, wherein the controller increases the number of notches as the number of the gripping fingers increases.

6. The operation input device according to claim 1, wherein the controller determines whether the operation member is being stopped or moving or whether a predetermined period of time has elapsed since the operation member has been stopped, the controller permits the switching of the types of the operation commands when it is determined that the operation member is being stopped or the predetermined period of time has elapsed since the operation member has been stopped, while the controller prohibits the switching of the types of the operation commands when it is determined that the operation member is moving or the predetermined period of time has not elapsed since the operation member has been stopped.

7. The operation input device according to claim 1, wherein the operation input device is provided with a vibration generating device which generates and applies vibration to the operation member, and the controller causes the vibration generating device to generate the vibration in accordance with the number of the gripping fingers.

8. The operation input device according to claim 1, wherein the operation member is provided with an indicator which notifies the user of the number of the gripping fingers by light emission or a display representing the number of the gripping fingers.

9. An operation input device comprising:
a dial switch configured to be gripped and operated by a plurality of user's fingers and to generate an operation input based on the operation by the plurality of the fingers; and
a controller configured to receive and process the operation input so as to control at least one operation target device based on the operation input, wherein
the dial switch comprises a finger sensor configured to detect each of the plurality of fingers which are simultaneously gripping the dial switch,
the controller determines a number of the fingers simultaneously gripping the dial switch, based on the detection of the fingers by the finger sensor,
the at least one operation target is controlled by different types of operation commands, each type of the operation commands being operable by the operation input, and
the controller switches, in accordance with the number of the simultaneously gripping fingers, the types of operation commands to be operated by the operation input for controlling the at least one operation target,
wherein the controller determines whether the dial switch is being stopped or moving or whether a predetermined period of time has elapsed since the dial switch has been stopped,
the controller permits the switching of the types of the operation commands when it is determined that the dial switch is being stopped or the predetermined period of time has elapsed since the dial switch has been stopped, while the controller prohibits the switching of the types of the operation commands when it is determined that the dial switch is moving or the predetermined period of time has not elapsed since the dial switch has been stopped.

* * * * *